(12) United States Patent
Yamamoto et al.

(10) Patent No.: US 7,901,074 B2
(45) Date of Patent: Mar. 8, 2011

(54) LENS FOR SAFETY GLASSES

(75) Inventors: Tamenobu Yamamoto, Osaka (JP); Yoshihisa Ishiba, Osaka (JP); Koichiro Oka, Osaka (JP)

(73) Assignee: Yamamoto Kogaku Co., Ltd. (JP)

( * ) Notice: Subject to any disclaimer, the term of this patent is extended or adjusted under 35 U.S.C. 154(b) by 301 days.

(21) Appl. No.: 11/722,949

(22) PCT Filed: Dec. 27, 2005

(86) PCT No.: PCT/JP2005/023952
§ 371 (c)(1),
(2), (4) Date: Jun. 27, 2007

(87) PCT Pub. No.: WO2006/070830
PCT Pub. Date: Jul. 6, 2006

(65) Prior Publication Data
US 2007/0285615 A1 Dec. 13, 2007

(30) Foreign Application Priority Data
Dec. 28, 2004 (JP) ................. 2004-378503

(51) Int. Cl.
*G02C 7/10* (2006.01)
*G02B 5/22* (2006.01)
*G02B 13/14* (2006.01)
(52) U.S. Cl. .......... 351/163; 359/614; 359/722; 359/885
(58) Field of Classification Search ............. 351/159, 351/163–166, 44–49; 359/601–614, 722, 359/723, 885–892
See application file for complete search history.

(56) References Cited

U.S. PATENT DOCUMENTS

| 3,519,339 | A | * | 7/1970 | Hutchinson et al. ............ 351/44 |
| 4,637,678 | A | * | 1/1987 | Moss et al. ...................... 359/15 |
| 5,805,336 | A | | 9/1998 | Dalzell |
| 6,113,813 | A | | 9/2000 | Goudjil |
| 2002/0135735 | A1 | | 9/2002 | Yamamoto |
| 2004/0114242 | A1 | * | 6/2004 | Sharp ............................. 359/498 |
| 2004/0257525 | A1 | | 12/2004 | Moravec et al. |

FOREIGN PATENT DOCUMENTS
CN 1417148 A 5/2003
(Continued)

OTHER PUBLICATIONS

Extended European Search Report for corresponding European application No. EP05822721 mailed on Aug. 20, 2009.
(Continued)

*Primary Examiner* — Darryl J Collins
(74) *Attorney, Agent, or Firm* — Heslin Rothenberg Farley & Mesiti P.C.

(57) ABSTRACT

In a lens for safety glasses of the present invention, a first lens element which shields a laser beam is laid on a second lens element for antiglare. The first and the second lens element may be affixed together. In the lens for safety glasses, the first lens element includes a substrate which contains an absorbent for selectively absorbing a laser beam having a specific wavelength in an ultraviolet wavelength region, a visible light wavelength region or an infrared wavelength legion and is transparent in the visible light wavelength region. The safety glasses with the lens may provide comfortable fit and a good appearance, causes less misjudgment of colors and prevents loss of correct color sense, and has both a laser-beam shielding function and an antiglare function.

16 Claims, 12 Drawing Sheets

FOREIGN PATENT DOCUMENTS

| | | |
|---|---|---|
| EP | 331469 A2 | 9/1989 |
| FR | 2208131 A | 6/1974 |
| JP | 54027451 | 3/1979 |
| JP | 62-231925 A | 10/1987 |
| JP | 63175824 | 7/1988 |
| JP | 6067125 | 3/1994 |
| JP | 11-4849 A | 1/1999 |
| JP | 2000-508436 A | 7/2000 |
| JP | 2001-311918 A | 11/2001 |
| JP | 2001350122 | 12/2001 |
| JP | 2003248202 A | 9/2003 |

OTHER PUBLICATIONS

Chinese Office Action, second, for corresponding Chinese Application No. 200580045254.4 issued on May 22, 2009.

* cited by examiner

LENS FOR SAFETY GLASSES

CROSS-REFERENCE TO RELATED APPLICATIONS

This application is a Section 371 filing of International Application No. PCT/JP2005/023952 filed on Dec. 27, 2005 and published, in Japanese, as International Publication No. WO 2006/070830 on Jul. 6, 2006, which claims priority of Japanese Application No. 2004-378503 filed on Dec. 28, 2004, which applications are hereby incorporated by reference herein, in their entirety.

TECHNICAL FIELD

The present invention relates to a lens for safety glasses having a laser beam shielding function and an antiglare function.

BACKGROUND ART

One example of conventional lenses for glasses protecting from laser beams is disclosed in the Japanese Patent Application published in the official gazette under 54-27451A (page 1), in which a colored glass is used as a filter, the glass having optical characteristics to restrain a transmission amount of a laser beam relating to an oscillation wavelength light of an oscillated laser beam to a tolerable transmission amount with respect to human eyes and highly transmitting the other wavelength lights.

Another example of lenses protecting from laser beam is disclosed in the Japanese Patent Application published in the official gazette under 62-231952A (page 1), in which at least one side of a plastic lens containing an absorption substance with a laser oscillation wavelength range in an absorption band has a lamination of high refractive index layers and low refractive index layers alternately(m=0 or 1), the lamination having an optical thickness of $(2m+1)\lambda/4$ (m=0, 1; $\lambda$=laser oscillation wavelength).

Moreover, one example of lenses for polarizing glasses is disclosed in Japanese Patent Application in the official gazette under 6-67125A (page 1). This lens includes a plurality of translucent materials having different refractive indices on a interface, and the interface has an inclined surface and the surface has a plurality of wave shapes in cross-section, the waves are provided adjacent to each other in one direction.

Furthermore, another example of lenses for polarizing glasses is disclosed in the Japanese Patent Application in the official gazette under 2001-350122A (page 1). This lens includes a first lens element made of an inorganic glass, a thermoplastic synthetic resin or a thermosetting synthetic resin, a second lens element made of a thermoplastic synthetic resin or a thermosetting synthetic resin, and a polarizing film. The production method thereof includes a step of attaching and affixing the first and second lens elements in a manner that the polarizing film stands between the elements.

Patent Document 1: the official gazette, No. 54-27451A (page 1)

Patent Document 2: the official gazette, No. 62-231925A (page 1)

Patent Document 3: the official gazette, No. 6-67125A (page 1)

Patent Document 4: the official gazette, No. 2001-350122A (page 1)

SUMMARY OF THE INVENTION

Problems to be Solved by the Invention

However, there has been no prior art of the lens for safety glasses having both an laser shielding function and an antiglare function.

Then, in a case an antiglare function becomes necessary while the safety glasses protecting from laser beams is used, for example, a clip-type or over-glass-type lens for polarizing glasses separately prepared is often put on the lens of the safety glasses. Therefore, the safety glasses used as above are less comfortable and less attractive in appearance.

Moreover, since a high level light shielding is generally required due to characteristics of laser beams, the lens for glasses protecting from laser beams, which is provided with a light absorbent having a narrow bandwidth, has a special color. Therefore, with the laser protection glasses using this lens, wearers have been experienced error of color recognition during work or temporary loss of correct color sense after work, and thus the risk of misjudging subjects exists especially in a case of a surgery using a laser beam.

Then, solving the problems stated above is an object of the present invention, and in particular it is an object of the present invention to provide a lens for safety glasses which, when used in safety glasses, yields comfortablility and a good appearance, prevents wrong recognition of color or loss of correct color sense and has both a laser shielding function and an antiglare function.

Means for Solving the Problems

For the above purposes, a lens for safety glasses of the present invention includes a first lens element for shielding a laser beam and a second antiglare lens element which is laid on the first lens element.

Furthermore, the lens for safety glasses of the present invention includes a first lens element for shielding a laser beam and a second antiglare lens element which is affixed to the first lens element.

Then, in the lens for safety glasses of the present invention, the first lens elements is a substrate containing an absorbent that selectively absorbs a laser beam having a specific wavelength in an ultraviolet wavelength region, a visible light wavelength region or an infrared wavelength region, and being transparent in the visible light wavelength region.

Furthermore, in the lens for safety glasses of the present invention, the first lens element has an optical density of Log $\epsilon$=2.0 or more in the specific wavelength of the laser beam.

Moreover, in the lens for safety glasses of the present invention, the second lens element is a polarizing lens including one polarizer, a polarizing lens including one polarizer and one protection resin sheet as a constituent, or a polarizing lens including one polarizer and two protection resin sheets having the polarizer therebetween as a constituent.

Furthermore, in the lens for safety glasses of the present invention, a hue of the first lens element and a hue of the second lens element are complementary in color to each other.

Moreover, in the lens for safety glasses of the present invention, the first lens element and the second lens element are affixed together by thermal fusion.

Furthermore, in the lens for safety glasses of the present invention, the first lens element and second lens element are affixed together with an adhesive or a glue.

Moreover, in the lens for safety glasses of the present invention, the first and second lens elements are affixed together by injection molding.

Effects of the Invention

Since the lens for safety glasses of the present is structured as above, when employed in safety glasses, it yields comfortable fit and a good appearance, causes less difference in color recognition and color sense, and have not only a laser shielding function but also an antiglare function, and it is suitable to be used for safety glasses for a laser operation used in a brightly lightened operation room, a laser experiment, a laser measurement conducted outside, or the like.

BEST MODE FOR CARRYING OUT THE INVENTION

Figure 1:
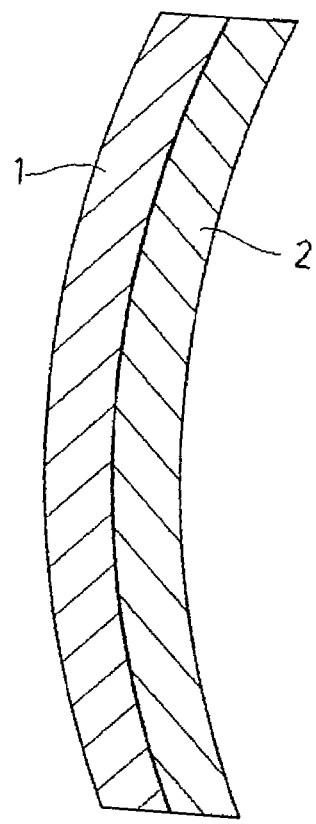
FIG. 1 is a cross-sectional view showing a first embodiment of a lens for safety glasses of the present invention.
Figure 2:
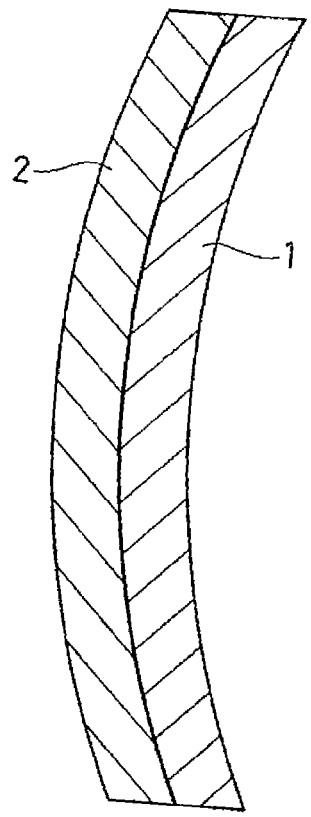
FIG. 2 is a cross-sectional view showing a second embodiment of a lens for safety glasses of the present invention.

Hereafter, best modes for carrying out a lens for safety glasses of the present invention will be explained in detail in conjunction with the drawings.

FIGS. 1 to 24 respectively show embodiments of lenses for safety glasses of the present invention, which respectively include a first lens element 1 for shielding laser beams and a second lens element 2 for antiglare.

The first lens element 1 contains an absorbent which selectively absorbs a laser beam having a specific wavelength in an ultraviolet light wavelength region, a visible light wavelength region, or an infrared light wavelength region, and forms a substrate transparent in the visible light wavelength region. Such a substrate includes a transparent glass and a transparent resin, and an injection-moldable transparent resin is suitable. Specific examples are an acrylic resin, a polycarbonate resin, a vinyl chloride resin, a polyester resin, nylon resin, a norbornene resin, a polyurethane resin, or the like, and the polycarbonate resin having a high toughness as a lens for safety glasses is preferable.

Then, the above-mentioned first lens element 1 has an optical density of Log $\epsilon$=2.0 or more, preferably Log $\epsilon$=5.0 or more in the specific wavelength of the laser beam.

The laser beam having a specific wavelength in a UV wavelength region, a visible light wavelength region or an IR wavelength region includes the following. In the UV wavelength region, there are an excimer laser using a gas mixture of argon and fluorine, an excimer laser using a gas mixture of krypton and fluorine, a third higher harmonic or a fourth higher harmonic of a neodium YAG, or the like. In the visible light wavelength region, there are blue or green laser such as a helium cadmium laser, an argon ion laser and a second higher harmonic of a neodium YAG, a red laser such as a helium neon and a ruby, or the like. Moreover, a semiconductor laser or the like covers a visible light from an IR beam.

Furthermore, as a UV absorbent used for these, benzophenone based substances such as 2,4-dihydroxy benzophenone and 2-hydroxy-4-methoxy benzophenone, salicylate based substances such as phenyl salicylate and 4-tert-butyl phenyl salicylate, cyano acrylate based substances such as ethyl-2-cyano-3,3-diphenyl acrylate, and benzotriazol based substances such as 2,2'-dihydroxy-4,4'-dimethoxy benzophenone, 2-(2H-benzotriazol-2-yl)-4-mentyl-6-(3,4,5,6-tetrahydro phthalimidyl methyl)phenone can be used. In terms of weather resistance, processability or the like, benzotriazol based substances is preferable. In particular, 2-(2H-benzotriazol-2-yl)-4-mentyl-6-(3,4,5,6-tetrahydro phthalimidyl methyl)phenone is further preferable.

As an absorbent for the blue, green light wavelength region, indigo based pigments such as oxindigo and isooxindigo, quinophthalone based pigments such as quinophthalone and 3'-hydroxy quinophthalone, quinine based pigments such as 1-methoxy anthraquinone, coumarin based pigments such as 4-methyl-7-diethyl amino coumarin, chlorophyll based pigment, diphenyl methane based pigments such as diphenyl methylium chloride, spiropyran based pigments such as 7-carboxy-1',3'3'-trimethyl spiro[2H-1-benzopyran-2,240-indoline], thiazine based pigments such as 2-amino-4-(2'-triethyl)-6H-1,3-thiazine-6-sion, and triphenyl methane based pigment such as triphenyl methylium-chloride can be used. In terms of weather resistance, transparency, processability or the like, a quinophthalone based pigment is preferable, and 3'-hydroxy quinophthalone is further preferable among others.

As an absorbent for the red light wavelength region, indigo based pigments such as indigo and 5,5'-dibrome indigo, quinine based pigment such as 4-(4'-oxide phenyl imide)-1,4-benzoquinone, coumarin based pigment such as coumarin fluorescent dye, triphenyl methane based pigment such as tris (p-diethyl amino phenyl)-3-methyl methylium chloride, chlorophyll based pigment, diphenyl methane based pigment such as phenyl phenyl vinyl methyl, spiropyran based pigments such as 3'-ethyl-3-phenyl-6-nitrospiro [2H-1-benzopyran-2,2'-benzothiazine], phthalocyanine based pigments such as copper phthalocyanine, or the like can be used. In terms of weather resistance, transparency, processability or the like, a phthalocyanine based pigment is preferable, and in particular, copper phthalocyanine is preferable.

Moreover, among IR absorbents which specially absorb in a near infrared wavelength region, such as a cyanine based, squarilium based, methine based, naphtoquinone based, quinonimine based, phthalocyanine based, tetradehydrocolin based, and ethylene 1,2-dithiol based metal complex, some of them also absorb a red light beam, and such may be used as well.

For containing the absorbents that selectively absorb a laser beam, a method in which an absorbent is internally added in a synthetic resin for forming the lens element 1 by a kneading method or the like, a method in which a coating solution containing a absorbent is coated on a surface of the lens element 1, or the like can be employed. The method of internal addition is preferable because it enables to make a lens thin and provides a high light-shielding performance with a relatively low concentration.

The second lens element 2 is a polarizing lens generally made of a single polarizer, a polarizing lens including a single polarizer and a single protection resin sheet as a constituent, or a polarizing lens including a single polarizer and two protection resin sheets having the polarizer therebetween as the constituent. From a viewpoint of protecting the polarizer, the polarizing lens including a single polarizer and two protection resin sheets having the polarizer therebetween as the constituent is preferable. The polarizer is in general a polyvinyl alcohol based mono-axial drawn film impregnated with iodine or a dichroic pigment, having a thickness of 100 μm or less. The protection resin sheet should be transparent in a visible light wavelength region. In a case of extrusion molding or injection molding, the same substrate as used in the first lens element 1 can be used. From a viewpoint of a thermal fusion property, it is preferable to use the same substrate as used in the first lens element 1. The protection resin sheet is in general a drawn film-like synthetic resin sheet of several mm or less thickness. Moreover, in a case of cast molding, a cellulose ester resin may be used for the protection resin sheet, which is in general an undrawn film-like synthetic resin sheet of several mm or less thickness. Furthermore, the protection resin sheet may contain an absorbent which selectively absorbs a laser beam. The polarizer and the protection resin sheet are in general affixed together with an adhesive or a glue.

Then, the second lens element 2 may absorb 50% or more of a visible light beam. Furthermore, the second lens element 2 may absorb 50% or more of the visible light beam in the specific wavelength region of the laser beam in the visible light wavelength region. Moreover, the second lens element 2 may absorb 50% or more of the visible light beam of a wavelength region excluding the specific wavelength region of the laser beam in the visible light wavelength region.

In the embodiments shown in FIGS. 1 to 6, the first lens element 1 is laid on the second lens element 2.

In the embodiment shown in FIG. 1, an outer surface of the second lens element 2 is put on an inner surface of the first lens element 1 without a gap and the two lens elements are fixed together with a frame of the glasses or the like (not shown). In the embodiment shown in FIG. 2, an inner surface of the second lens element 2 is put on an outer surface of the first lens element 1 without a gap and the lens elements are fixed together with the frame of the glasses or the like (not shown). The first lens element 1 and the second lens element 2 are respectively formed in a lens shape by press molding.

Figure 3:
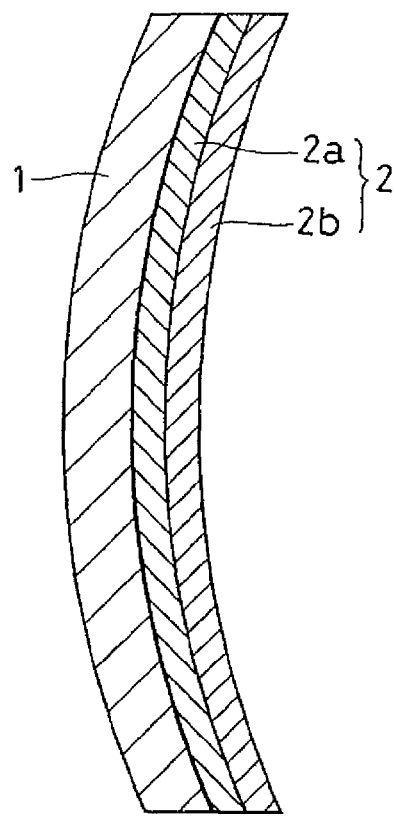
FIG. 3 is a cross-sectional view showing a third embodiment of a lens for safety glasses of the present invention.
Figure 4:
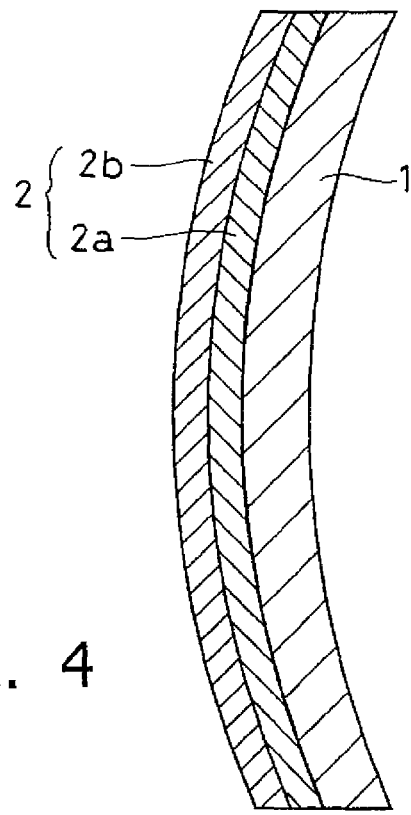
FIG. 4 is a cross-sectional view showing a fourth embodiment of a lens for safety glasses of the present invention.

Furthermore, in the embodiment shown in FIG. 3, a polarizing plate with one polarizer 2a and one protection resin sheet 2b as a constituent is produced and cut into a suitable size, and the resultant plate is press-molded into a lens shape so as to obtain a second lens element 2. Then, an outer surface of this second lens element 2 is laid without a gap onto an inner surface of the first lens element 1 formed into a lens shape by press molding and the lens elements are fixed together with a frame of the glasses or the like (not shown). In the embodiment shown in FIG. 4, an inner surface of the second lens element 2 obtained as above is put on an outer surface of the first lens element 1 formed into a lens shape by press molding without a gap and the elements are fixed together with the frame of the glasses or the like (not shown).

Figure 5:
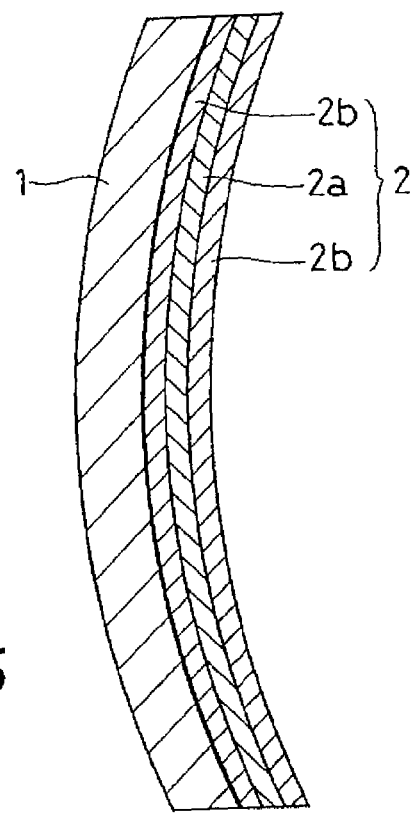
FIG. 5 is a cross-sectional view showing a fifth embodiment of a lens for safety glasses of the present invention.
Figure 6:
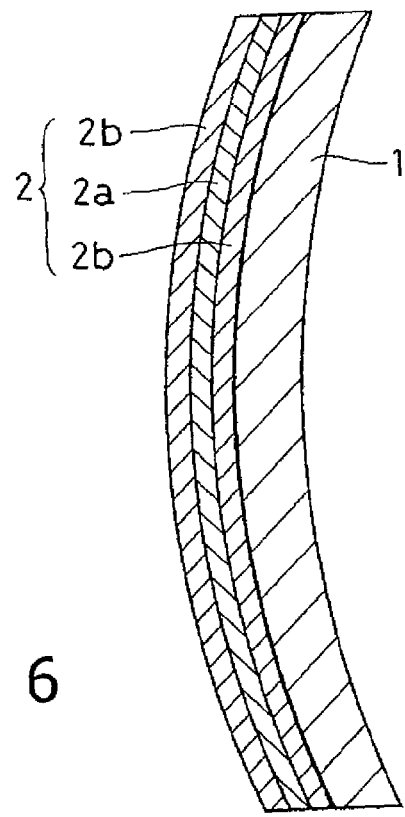
FIG. 6 is a cross-sectional view showing a sixth embodiment of a lens for safety glasses of the present invention.

Moreover, in the embodiment shown in FIG. 5, a polarizing plate including one polarizer 2a and two protection resin sheets 2b, 2b having the polarizer 2a therebetween as a constituent is produced, and cut into a suitable size, and the resultant plate is press-molded into a lens shape so as to obtain a second lens element 2. Then, an outer surface of this second lens element 2 is laid without a gap onto an inner surface of the first lens element 1 formed into a lens shape by press molding and the lens elements are fixed together with a frame of the glasses or the like (not shown). In the embodiment shown in FIG. 6, an inner surface of the second lens element 2 obtained as above is put on an outer surface of the first lens element 1 formed into a lens shape by press molding without a gap and the elements are fixed together with the frame of the glasses or the like (not shown). In the embodiments shown in FIGS. 7 to 18, the first lens element 1 and the second lens element 2 are affixed together.

Figure 7:
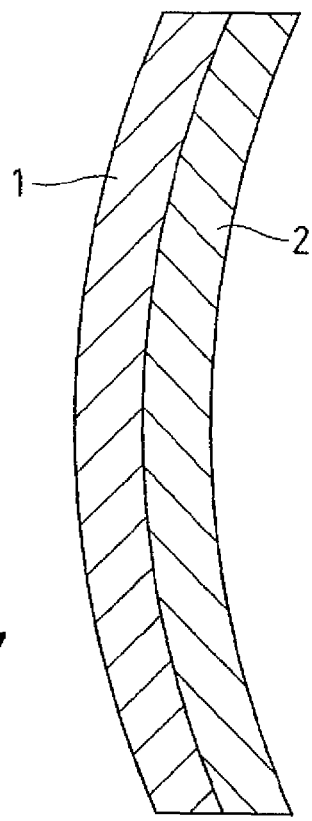
FIG. 7 is a cross-sectional view showing a seventh embodiment of a lens for safety glasses of the present invention.
Figure 8:
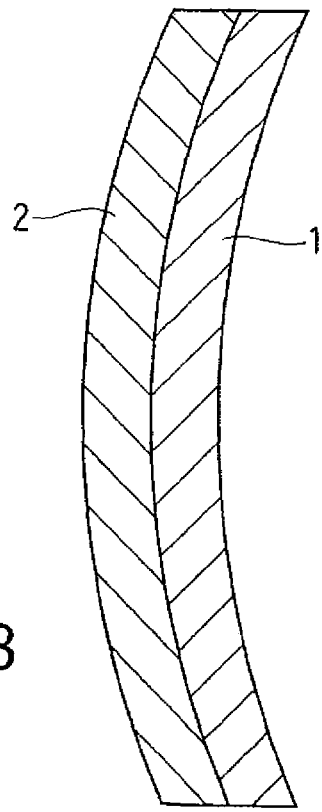
FIG. 8 is a cross-sectional view showing an eighth embodiment of a lens for safety glasses of the present invention.
Figure 9:
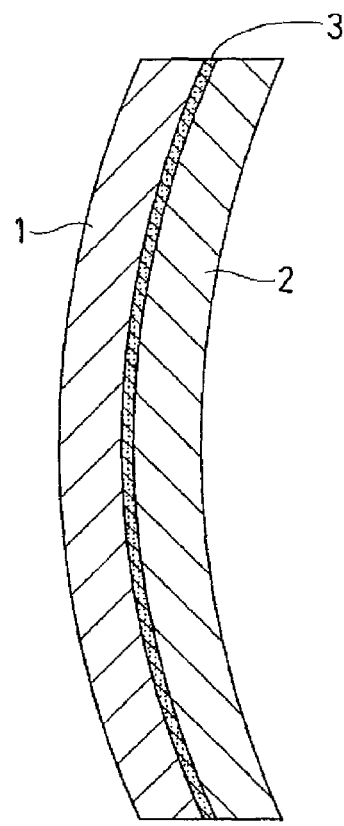
FIG. 9 is a cross-sectional view showing a ninth embodiment of a lens for safety glasses of the present invention.
Figure 10:
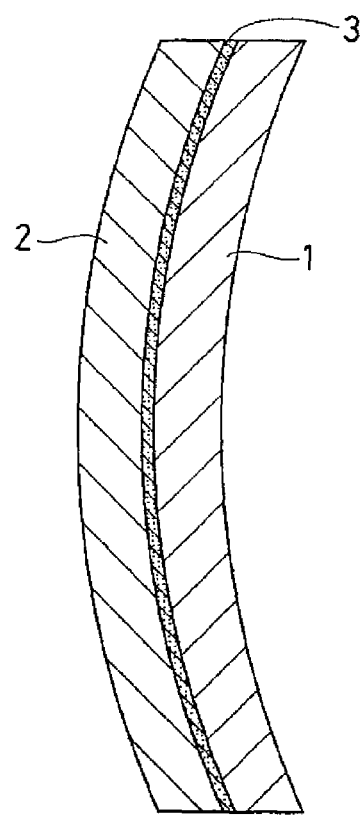
FIG. 10 is a cross-sectional view showing a tenth embodiment of a lens for safety glasses of the present invention.

Specifically, in the embodiments shown in FIGS. 7 and 8, the first lens element 1 and the second lens element 2 are affixed together by thermal fusion, and in the embodiments shown in FIGS. 9 and 10, the first lens element 1 and the second lens element 2 are affixed together with an adhesive or a glue. The first lens element 1 and the second lens element 2 are respectively molded into a lens shape by press working. A reference numeral 3 in FIGS. 9 and 10 denotes an adhesive layer or a glue layer.

Figure 11:
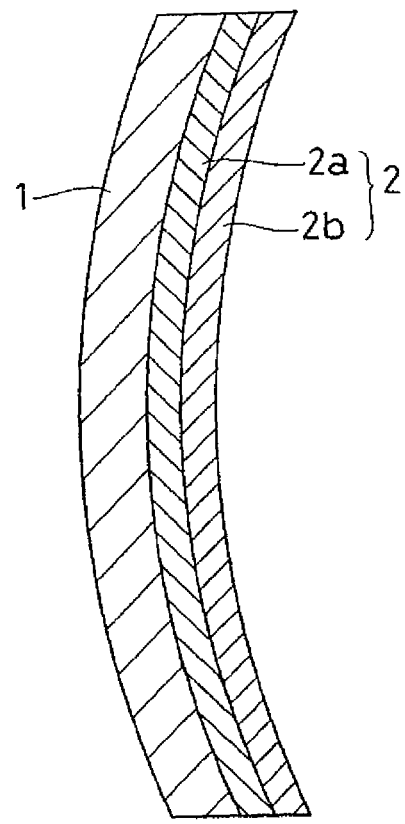
FIG. 11 is a cross-sectional view showing an eleventh embodiment of a lens for safety glasses of the present invention.
Figure 12:
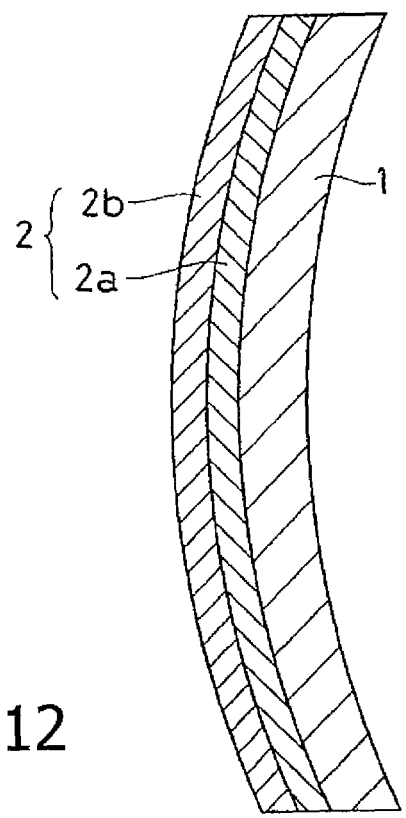
FIG. 12 is a cross-sectional view showing a twelfth embodiment of a lens for safety glasses of the present invention.

In the embodiment shown in FIG. 11, the second lens element 2 is obtained in the same manner as in the embodiment shown in FIG. 3. Then, an outer surface of the second lens element 2 is affixed to an inner surface of the first lens element 1 formed into a lens shape by press molding by thermal fusion. In the embodiment shown in FIG. 12, an inner surface of the second lens element 2 obtained as above is affixed to an outer surface of the first lens element 1 formed into a lens shape by press molding by thermal fusion.

Figure 13:
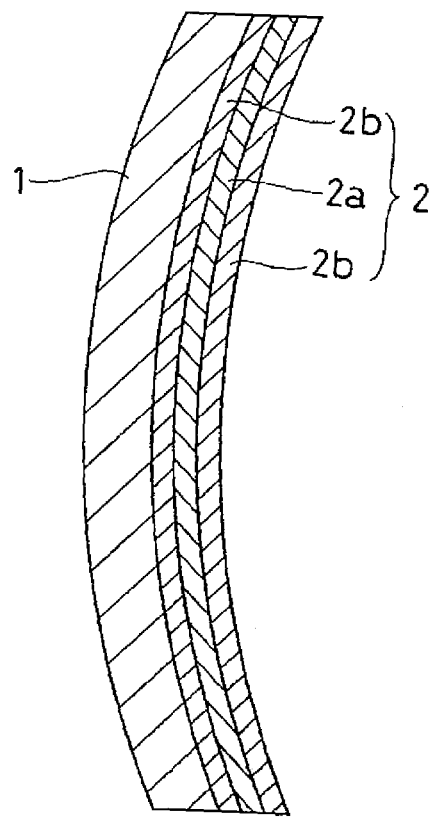
FIG. 13 is a cross-sectional view showing a thirteenth embodiment of a lens for safety glasses of the present invention.
Figure 14:
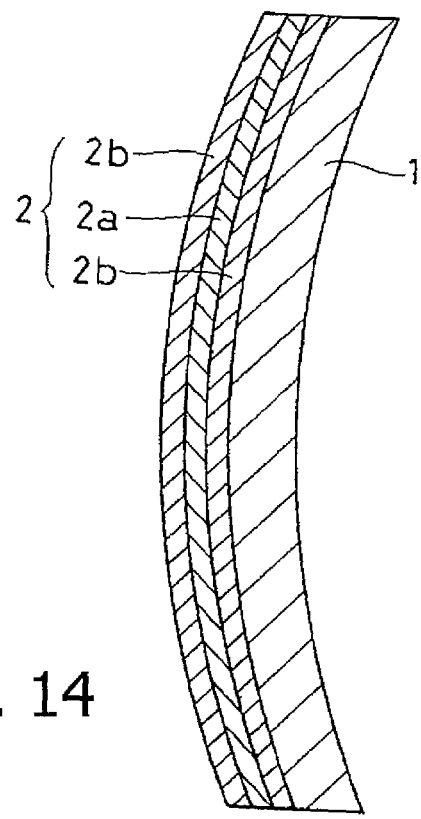
FIG. 14 is a cross-sectional view showing a fourteenth embodiment of a lens for safety glasses of the present invention.

In the embodiment shown in FIG. 13, the second lens element 2 is obtained in the same manner as in the embodiment shown in FIG. 5. Then, an outer surface of the second lens element 2 is affixed to an inner surface of the first lens element 1 by thermal fusion. In the embodiment shown in FIG. 14, an inner surface of the second lens element 2 obtained as above is affixed to an outer surface of the first lens element 1 by thermal fusion.

Figure 15:
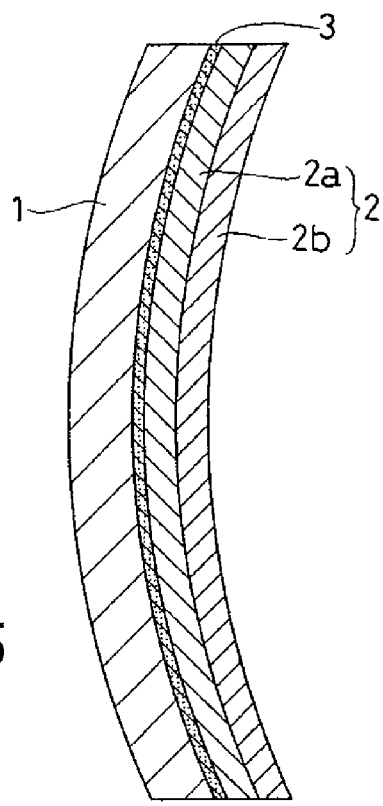
FIG. 15 is a cross-sectional view showing a fifteenth embodiment of a lens for safety glasses of the present invention.
Figure 16:
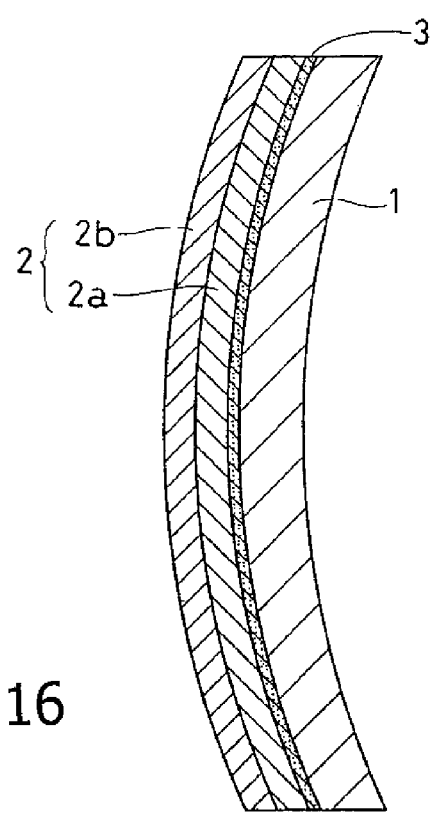
FIG. 16 is a cross-sectional view showing a sixteenth embodiment of a lens for safety glasses of the present invention.

In the embodiment shown in FIG. 15, the second lens element 2 is obtained in the same manner as in the embodiment shown in FIG. 3. Then, an outer surface of the second lens element 2 is affixed to an inner surface of the first lens element 1 formed into a lens shape by press molding with an adhesive or a glue. In the embodiment shown in FIG. 16, an inner surface of the second lens element 2 obtained as above is affixed to an outer surface of the first lens element 1 formed into a lens shape by press molding with an adhesive or a glue.

Figure 17:
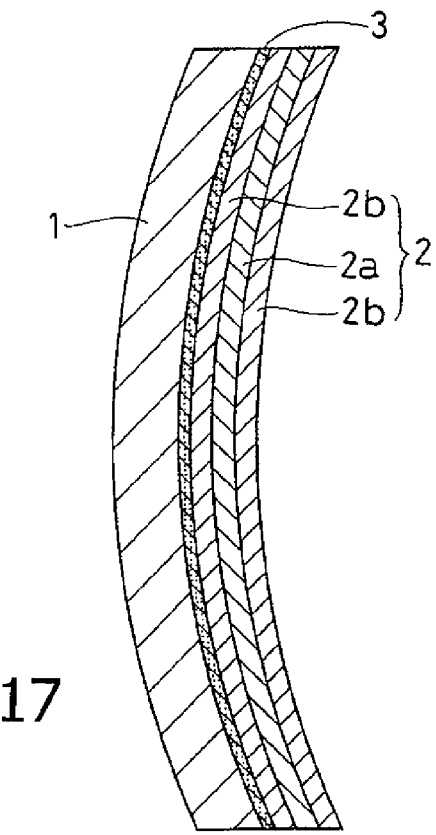
FIG. 17 is a cross-sectional view showing a seventeenth embodiment of a lens for safety glasses of the present invention.
Figure 18:
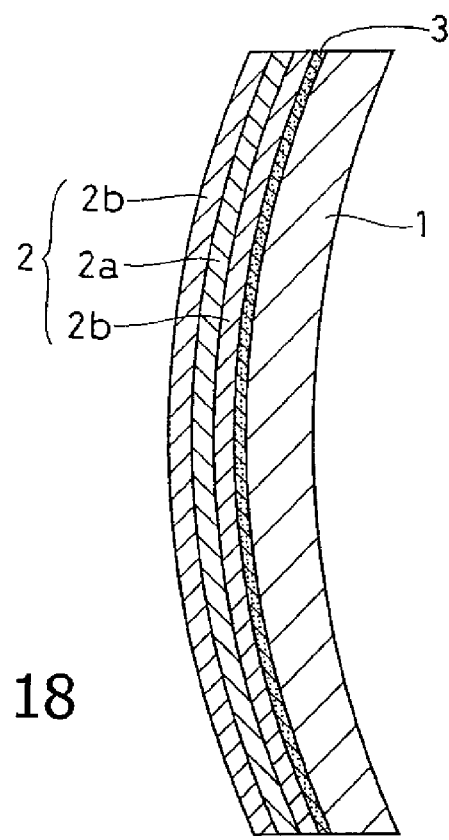
FIG. 18 is a cross-sectional view showing an eighteenth embodiment of a lens for safety glasses of the present invention.

In the embodiment shown in FIG. 17, the second lens element 2 is obtained in the same manner as in the embodiment shown in FIG. 5. Then, an outer surface of the second lens element 2 is affixed to an inner surface of the first lens element 1 with an adhesive or a glue. In the embodiment shown in FIG. 18, an inner surface of the second lens element 2 obtained as above is affixed to an outer surface of the first lens element 1 with an adhesive or a glue.

Furthermore, for affuixng the first lens element 1 and the second lens element 2 together, the first lens element 1 could be affixed to the second lens element 2 by injection molding.

Figure 19:
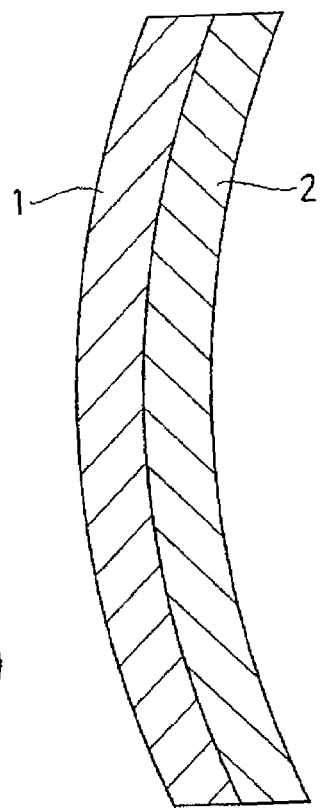
FIG. 19 is a cross-sectional view showing a nineteenth embodiment of a lens for safety glasses of the present invention.
Figure 20:
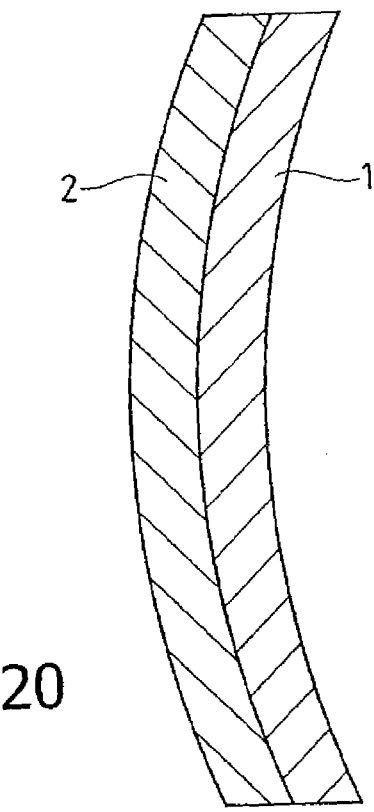
FIG. 20 is a cross-sectional view showing a twentieth embodiment of a lens for safety glasses of the present invention.

Specifically, in the embodiments shown in FIGS. 19 and 20, the second lens element 2 formed into a lens shape is obtained by press molding. Then, the second lens element 2 is set on an insert injection molding machine, and the first lens element 1 is then formed on the second lens elements 2 by insert injection molding to be affixed thereon.

Figure 21:
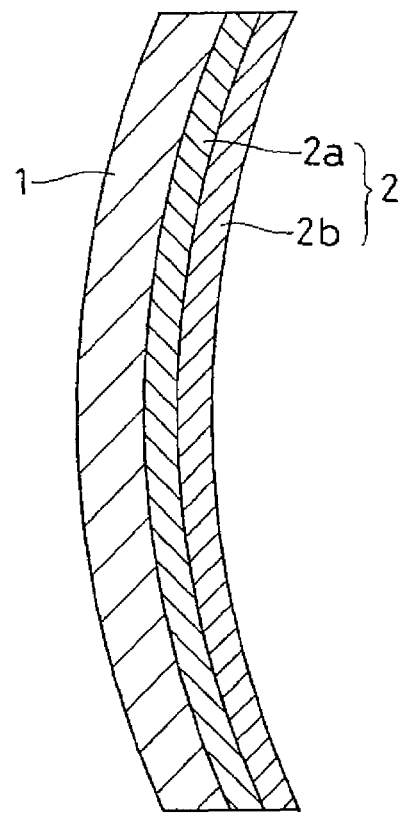
FIG. 21 is a cross-sectional view showing a twenty-first embodiment of a lens for safety glasses of the present invention.
Figure 22:
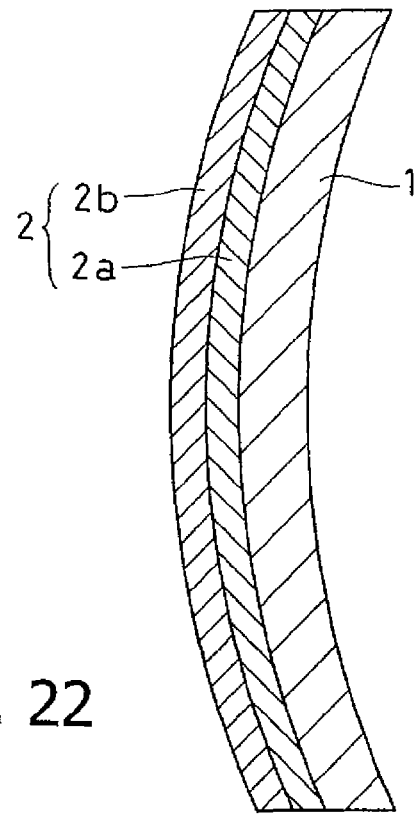
FIG. 22 is a cross-sectional view showing a twenty-second embodiment of a lens for safety glasses of the present invention.

In the embodiments shown in FIGS. 21 and 22, the second lens element 2 is obtained in the same manner as in the embodiment shown in FIG. 3. Then the second lens element 2 is set on an insert injection molding machine, the first lens element 1 is then formed on the second lens elements 2 by insert injection molding and affixed thereon.

Figure 23:
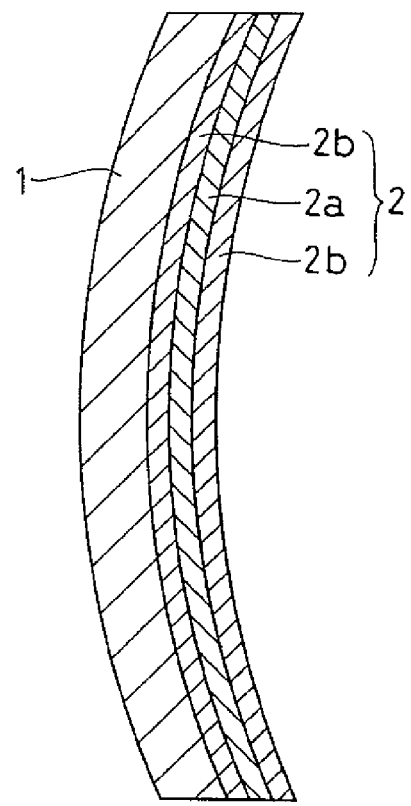
FIG. 23 is a cross-sectional view showing a twenty-third embodiment of a lens for safety glasses of the present invention.
Figure 24:
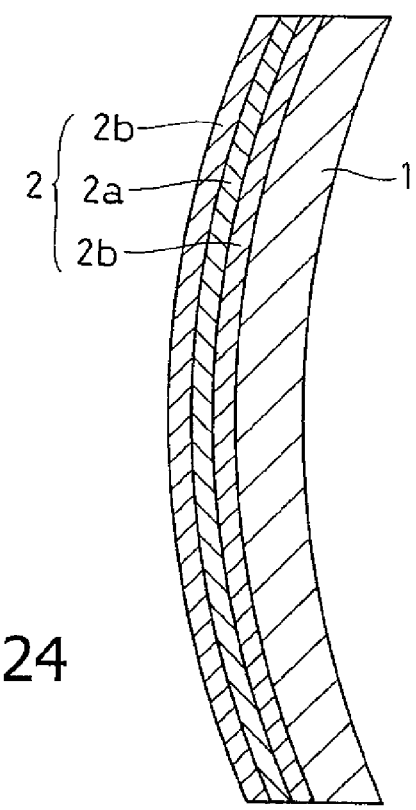
FIG. 24 is a cross-sectional view showing a twenty-fourth embodiment of a lens for safety glasses of the present invention.

In the embodiments shown in FIGS. 23 and 24, the second lens element 2 is obtained in the same manner as in the embodiment shown in FIG. 5. Then, the second lens element 2 is set on an insert injection molding machine, the first lens element 1 is then formed on the second lens elements 2 by insert injection molding and affixed thereon.

Moreover, it is preferable that the lens for safety glasses of the present invention has a hue of the first lens element 1 and a hue of the second lens element 2 in a complementary color relation. With this structure, risk of misjudging subjects, for example in a case of a surgery using a laser beam, by error in color recognition during work can be avoided, and also temporary loss of correct color sense after work can be prevented.

For providing the hue of the first lens element 1 being complementary in color to the hue of the second lens element 2 or vice versa, a pigment for correcting the complementary color can be added to the substrate itself forming the first lens element 1, to the protection resin plate forming the second lens element, to an adhesive or a glue for affixing the first and second lens elements 1and 2 together, or to an adhesive or a glue for affixing the polarizer or the protection resin plate.

Hereafter, a specific production method of the embodiments of the lens for safety glasses of the present invention will be explained in detail.

First, 3 parts of an absorbent that selectively absorbs a laser beam having a specific wavelength in a UV wavelength region (SEESORB 201, produced by SHIPRO KASEI KAISHA, LTD.) and 0.1 part of an antioxidant (ADEKASTABU 2112, produced by ADEKA CORPORATION) are added to 100 parts of a bisphenol type polycarbonate resin powder having an average molecular weight of 18,000 to 30,000 to sufficiently disperse with a mixer. Then, the obtained mixture is converted into a compound with an extrusion molding machine to obtain a pellet resin having a mean diameter of 3 mm. Then, in a lens mold in which a radius of curvature is adjusted to 50 to 150 mm and a thickness is adjusted to 1.2 to 4.0 mm, and which is heated up to a temperature of 80 to 130° C., a polarizing film (thickness: 0.2 to 1.0 mm) with polycarbonate resin sheets having the film therebetween is formed into a lens shape, preliminarily molded into a curvature of 70 to 200 mm, and then be solidified by a suction strength of 100,000 PA. The above pellet resin is melted at 200 to 350° C. and poured on one side of the polarizing film, then cooled down and re-cured, thereby a lens for safety glasses is obtained.

The lens for safety glasses produced by the above-mentioned method has a transmittance of 20 to 50% to a visible light beam and a polarizing degree of 90% or more, and thereby resulting in providing an enhanced antigrare effect.

The lens for safety glasses stated above is prepared into a glasses-lens shape, and then provided with a temple or the like, so that safety glasses are obtained. The resultant safety glasses shield a laser beam hurting human eyes, effectively avoid a radiation beam, and provide a comfortable work environment when employed in a surgery using a laser beam or the like.

What is claimed is:

1. A lens for safety glasses comprising a first lens element for shielding a laser beam and a second lens element for antiglare which is laid on the first lens element;
wherein the first lens element comprises a substrate which contains an absorbent for selectively absorbing a laser beam having a specific wavelength in one of an ultraviolet wavelength region, a visible light wavelength region, and an infrared wavelength region, and the substrate is transparent in the visible light wavelength region.

2. The lens for safety glasses according to claim 1, wherein the second lens element comprises one of a polarizing lens including one polarizer, a polarizing lens including one polarizer and one protection resin sheet, and a polarizing lens including one polarizer and two protection resin sheets having the one polarizer therebetween.

3. The lens for safety glasses according to claim 1, wherein the first lens element has an optical density of Log $\epsilon$=2.0 or more in the specific wavelength of the laser beam, wherein $\epsilon$ is an inverse transmittance of the first lens element.

4. The lens for safety glasses according to claim 1, wherein a hue of the first lens element and a hue of the second lens element are complementary to each other in color.

5. The lens for safety glasses according to claim 4, wherein at least one of the hue of the first lens element and the hue of the second lens element is provided by a pigment.

6. The lens for safety glasses according to claim 1, wherein shielding the laser beam comprises reducing a transmittance of the laser beam.

7. The lens for safety glasses according to claim 6, wherein reducing the transmittance comprises providing a transmittance of 20% to 50% of the laser beam.

8. A lens for safety glasses comprising a first lens element for shielding a laser beam and a second lens element for antiglare which is affixed to the first lens element;
   wherein the first lens element comprises a substrate which contains an absorbent for selectively absorbing a laser beam having a specific wavelength in one of an ultraviolet wavelength region, a visible light wavelength region and an infrared wavelength region, and the substrate is transparent in the visible light wavelength region.

9. The lens for safety glasses according to claim 8, wherein the first lens element and the second lens element are affixed by thermal fusion.

10. The lens for safety glasses according to claim 8, wherein the first lens element and the second lens element are affixed by one of an adhesive and a glue.

11. The lens for safety glasses according to claim 8, wherein the first lens element and the second lens element are affixed through injection molding.

12. The lens for safety glasses according to claim 8, wherein the second lens element comprises one of a polarizing lens including one polarizer, a polarizing lens including one polarizer and one protection resin sheet, and a polarizing lens including one polarizer and two protection resin sheets having the one polarizer there between.

13. The lens for safety glasses according to claim 8, wherein a hue of the first lens element and a hue of the second lens element are complementary to each other in color.

14. The lens for safety glasses according to claim 8, wherein the first lens element has an optical density of Log $\epsilon$=2.0 or more in the specific wavelength of the laser beam, wherein $\epsilon$ is an inverse transmittance of the first lens element.

15. The lens for safety glasses according to claim 8, wherein shielding the laser beam comprises reducing a transmittance of the laser beam.

16. The lens for safety glasses according to claim 15, wherein reducing the transmittance comprises providing a transmittance of 20% to 50% of the laser beam.

* * * * *

UNITED STATES PATENT AND TRADEMARK OFFICE
CERTIFICATE OF CORRECTION

PATENT NO.         : 7,901,074 B2
APPLICATION NO.    : 11/722949
DATED              : March 8, 2011
INVENTOR(S)        : Tamenobu Yamamoto et al.

It is certified that error appears in the above-identified patent and that said Letters Patent is hereby corrected as shown below:

1. Col. 8 line 53 – Second line reads "Log $\varepsilon$=2.0" (no spaces)
Claim should read – "Log $\varepsilon$ = 2.0" (with spaces)

2. Col. 8 line 54 – Third line last word reads "$\varepsilon$is" (no spaces)
Claim should read – "$\varepsilon$ is" (with space between)

3. Col. 10 line 10 – Third line reads "$\varepsilon$=2.0" (no spaces)
Claim should read – "$\varepsilon$ = 2.0" (with spaces)

4. Col. 10 line 11 – Last lines reads "$\varepsilon$is" (no spaces)
Claim should read – "$\varepsilon$ is" (with spaces between)

Signed and Sealed this
Fourteenth Day of June, 2011

David J. Kappos
*Director of the United States Patent and Trademark Office*